(12) United States Patent
Rajakarunanayake (10) Patent No.: US 7,765,244 B2
(45) Date of Patent: Jul. 27, 2010

(54) FAST AND EFFICIENT METHOD FOR DELETING VERY LARGE FILES FROM A FILESYSTEM

(75) Inventor: Yasantha Nirmal Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 81 days.

(21) Appl. No.: 11/543,826

(22) Filed: Oct. 6, 2006

(65) Prior Publication Data

US 2008/0005205 A1    Jan. 3, 2008

Related U.S. Application Data

(60) Provisional application No. 60/817,533, filed on Jun. 30, 2006.

(51) Int. Cl.
  *G06F 17/30* (2006.01)
(52) U.S. Cl. .................. 707/823; 709/217; 709/219; 711/147; 711/154; 711/161; 711/162; 711/165; 714/15; 714/4; 714/6
(58) Field of Classification Search .............. 707/200, 707/205, 1, 10, 100, 101, 102, 104.1, 201, 707/202, 203, 204, 3, 8; 709/217, 219; 710/200; 711/147, 154, 161, 162, 165; 714/15, 4, 714/6
See application file for complete search history.

(56) References Cited

U.S. PATENT DOCUMENTS

| 5,274,807 | A | | 12/1993 | Hoshen et al. | |
|---|---|---|---|---|---|
| 5,390,315 | A | | 2/1995 | Blandy et al. | |
| 5,454,101 | A | * | 9/1995 | Mackay et al. | 707/3 |
| 5,754,854 | A | | 5/1998 | Kanamori et al. | |
| 5,991,862 | A | | 11/1999 | Ruane | |
| 6,151,665 | A | | 11/2000 | Blumenau | |
| 6,377,960 | B1 | * | 4/2002 | Qiu et al. | 707/203 |
| 6,611,852 | B1 | | 8/2003 | Morley et al. | |
| 6,615,224 | B1 | * | 9/2003 | Davis | 707/202 |
| 6,636,879 | B1 | | 10/2003 | Doucette et al. | |
| 6,636,951 | B1 | * | 10/2003 | Tachikawa | 711/154 |
| 6,640,290 | B1 | | 10/2003 | Forin et al. | |
| 6,658,437 | B1 | | 12/2003 | Lehman | |
| 6,751,635 | B1 | * | 6/2004 | Chen et al. | 707/200 |
| 6,839,822 | B2 | | 1/2005 | Knippel et al. | |
| 6,874,004 | B2 | | 3/2005 | Jolly | |
| 2002/0083037 | A1 | * | 6/2002 | Lewis et al. | 707/1 |
| 2002/0198886 | A1 | | 12/2002 | Ramakrishnan | |
| 2003/0088877 | A1 | * | 5/2003 | Loveman et al. | 725/92 |
| 2003/0115222 | A1 | * | 6/2003 | Oashi et al. | 707/200 |
| 2003/0158863 | A1 | * | 8/2003 | Haskin et al. | 707/200 |
| 2003/0159007 | A1 | * | 8/2003 | Sawdon et al. | 711/154 |

(Continued)

OTHER PUBLICATIONS

Appleton, A Non-Technical Look inside the EXT2 File System, Aug. 1, 1997.*

*Primary Examiner*—James Trujillo
*Assistant Examiner*—William Spieler
(74) *Attorney, Agent, or Firm*—Sterne, Kessler, Goldstein & Fox P.L.L.C.

(57) ABSTRACT

In the current invention, a method and apparatus for efficiently deleting large files is described. This is done by having a special inode for pointing to data blocks to be freed, and subsequently freeing the data blocks from the special inode in a controlled manner.

14 Claims, 6 Drawing Sheets

U.S. PATENT DOCUMENTS

| | | | |
|---|---|---|---|
| 2003/0182253 A1* | 9/2003 | Chen et al. | 707/1 |
| 2003/0236836 A1* | 12/2003 | Borthwick | 709/204 |
| 2004/0205088 A1* | 10/2004 | Toner | 707/200 |
| 2005/0015409 A1* | 1/2005 | Cheng et al. | 707/200 |
| 2005/0021565 A1* | 1/2005 | Kapoor et al. | 707/200 |
| 2005/0080823 A1* | 4/2005 | Collins | 707/200 |
| 2008/0005206 A1 | 1/2008 | Rajakarunanayake | |

* cited by examiner

FAST AND EFFICIENT METHOD FOR DELETING VERY LARGE FILES FROM A FILESYSTEM

CROSS-REFERENCE TO RELATED APPLICATIONS

The present application claims the benefit of U.S. Provisional Patent Application No. 60/817,533 filed on Jun. 30, 2006, which is incorporated herein by reference in its entirety.

BACKGROUND OF THE INVENTION

1. Field of the Invention

The present invention generally relates to data storage, and specifically to storage of video on a hard disk drive.

2. Background Art

Many users of satellite, cable, or even terrestrial video services have recently migrated from using analog magnetic media to record programming to digital video recorders ("DVRs"). DVRs take an input video from a video source, in digital format or in analog format by first digitizing the input video, and store the digital video on a fixed medium, such as a hard disk drive ("disk"). A user may subsequently select the recorded video for playback, record additional video, or delete the recorded video in order to free space in the disk for future recordings.

As High Definition Television ("HDTV") standards have become more common in consumer use, DVRs have evolved to record HDTV video. HDTV video includes high resolution images that require higher data storage needs for recording. A typical 2-to-3 hour HDTV recording can occupy a 15-to-20 Gigabyte ("GB") file.

The DVR's disk, used to store recorded content, typically includes a contiguous memory area divided into blocks. Blocks on a disk are the smallest units in which data are read from and written to the disk. In a typical disk, block sizes are small, usually around 4 kilobytes ("kB"). With a 4 kB block size, a file comprising 7 kB worth of data will consume 8 kB of disk space, because it will fully consume a 4 kB block and will consume 3 kB of a second 4 kB block. However, the remaining 1 kB on the second block cannot be used to store additional data.

In traditional filesystems, a file's structure is typically kept in an inode. The inode includes pointers to each of the blocks of data necessary to construct the file. These pointers may include a number of direct pointers, which point directly to blocks of the file's data, and some number of n-way (singly, doubly, etc.) indirect pointers. Indirect pointers are pointers that point to blocks of data that contain additional pointers. For each level of indirect access, there exists such a set of blocks of data containing additional pointers. At the final level of indirect access (the first level for indirect pointers, the second level for doubly indirect pointers, etc.), the pointers contained within the block of data are direct pointers.

Indirect pointers within an inode exist in order to allow individual files to encompass many blocks of data, and therefore allowing for very large file sizes. An inode with only direct access pointers would require the allocation, in advance, of memory for storing direct pointers to each block of data of the largest expected file size. Such an operation is wasteful when allocating smaller files. However, traversing several levels of indirection to access all of the blocks of data comprising a larger file is also expensive.

The typical 2-to-3 hour HDTV recording, occupying 15-to-20 GB of disk space, requires millions of 4 kB blocks to store the recording. Such a small block size is typically used in order to conserve space on the disk, as a 20 GB recording may consequently only waste most of a 4 kB block, an insignificant amount relative to the size of the recording. The drawback of using a small block size is, as noted, the sheer quantity of blocks needed to compose the recording.

A user desiring to delete a recording stored using a small block size may find that a typical 15-to-20 GB recording may take several minutes to delete. Prolonged deletion time can be attributed to the organization of files on a typical disk. In a traditional filesystem employing inodes as discussed above, the inode for a large recording may use a large number of n-way indirect pointers in order to provide a reference to the recording's data blocks. When deleting the recording, the filesystem has to read each pointer that points to valid data and zero them out, requiring a disk write operation to perform the zeroing. For n-way indirect pointers, the cost of accessing an additional block of data for each of the n-levels of indirection is added before being able to reach the recording's requested data block. Accordingly, the time required to perform this process is proportional to accessing the number of blocks comprising a recording times 4 bytes of data (the pointers, one per block) and writing the pointer back with a null reference.

Furthermore, as noted above, the filesystem may encounter pointers that refer to other data structures which in turn contain pointers to blocks of data in the filesystem. It may be possible for the second data structure to contain references to a third data structure, which in turn contains pointers to blocks of data in the filesystem. Such multiple levels of indirection in the filesystem generally require several seek operations by the disk in order to locate the pointed to data structure and child data structures or blocks of data. With disk seek times of a few milliseconds, accessing and zeroing all of the relevant data for a file may take 10-to-20 seconds per GB.

Accordingly, what is desired is a method for fast and efficient deletion of large files on a disk.

BRIEF SUMMARY OF THE INVENTION

An apparatus includes a CPU and a memory. The memory comprises data blocks, inodes, files, and a garbage collection inode. The files are each associated with one or more data blocks and an inode. The CPU is operable to delete a file from the memory by copying the address of the data blocks associated with the file from the inode associated with the file to the garbage collection inode. In accordance with an embodiment of the present invention, the memory includes a tangible recording medium, such as a hard disk drive.

A file is deleted in a memory by selecting an inode representing the file to be deleted. A second inode is designated as a garbage collection inode, wherein the garbage collection inode only points to files to be deleted. The inode contains an address which represents the location of a list of pointers to data blocks that compose the file to be deleted. This address is copied to the garbage collection inode. The inode is then set to no longer point to the location of the list of pointers. The garbage collection inode is subsequently traversed and each of the data blocks composing the file to be deleted are freed.

BRIEF DESCRIPTION OF THE DRAWINGS

The present invention is described with reference to the accompanying drawings. In the drawings, like reference numbers indicate identical or functionally similar elements. Additionally, left-most digit(s) of a reference number identifies the drawing in which the reference number first appears.

DETAILED DESCRIPTION OF THE INVENTION

Digital Video Recorder

Figure 1:
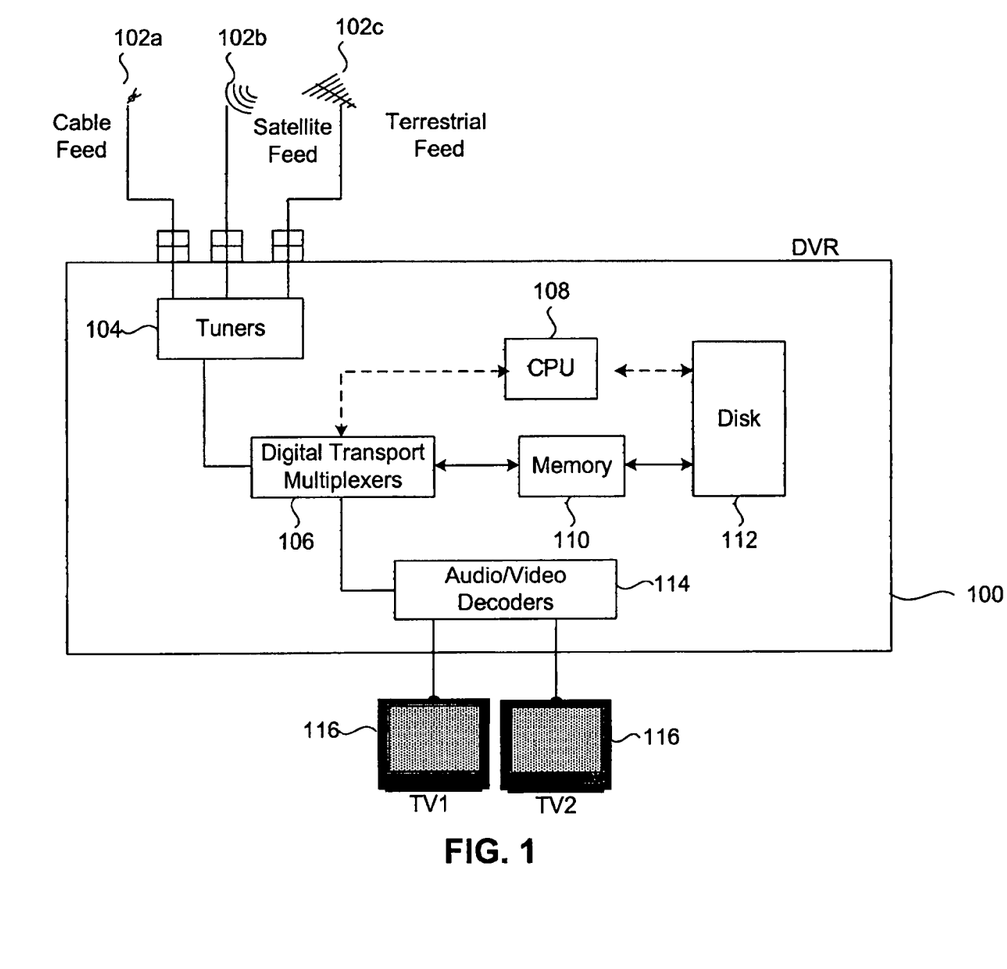
FIG. 1 illustrates a set-top box operable to perform digital video recording, in accordance with an embodiment of the present invention.

FIG. 1 illustrates a digital video recorder ("DVR") set-top box 100 having input video feeds 102a-102c and tuners 104. The tuners 104 are connected through digital transport multiplexers 106 to a CPU 108, a main memory 110, and a disk 112. The digital transport multiplexers are further connected to audio/video decoders 114, which in turn are connected to television monitors 116.

The tuners 104 are operable to select a video feed from a cable feed 102a, a satellite feed 102b, or a terrestrial feed 102c. One of sufficient skill in the relevant arts will recognize that the feeds 102a-102c could be any other medium of video transmission. The tuners 104 provide the selected video to digital transport multiplexers 106. The digital transport multiplexers 106 are then operable to transmit the selected video feed to audio/video decoders 114 for display on one or more television monitors 116.

The digital transport multiplexers 106 can alternatively transmit the selected video feed to a CPU 108 and a main memory 110 for storage in a disk 112. Furthermore, the CPU 108 can transmit a video feed stored on disk 112 through the main memory 110 to the digital transport multiplexers 106. The digital transport multiplexers 106 can be instructed to forward the video feed stored on disk 112 to the audio/video decoders 114 rather than the selected video feed coming from tuners 104. In this scenario, the audio/video decoders 114 will decode and transmit the video feed stored on disk 112 to the television monitors 116 for display.

One skilled in the relevant arts will appreciate that a number of different memory devices may be used instead of disk 112, including but not limited to such memory devices not typically used in DVR applications where the disclosed invention may nevertheless be employed.

Disk Organization

Figure 2:
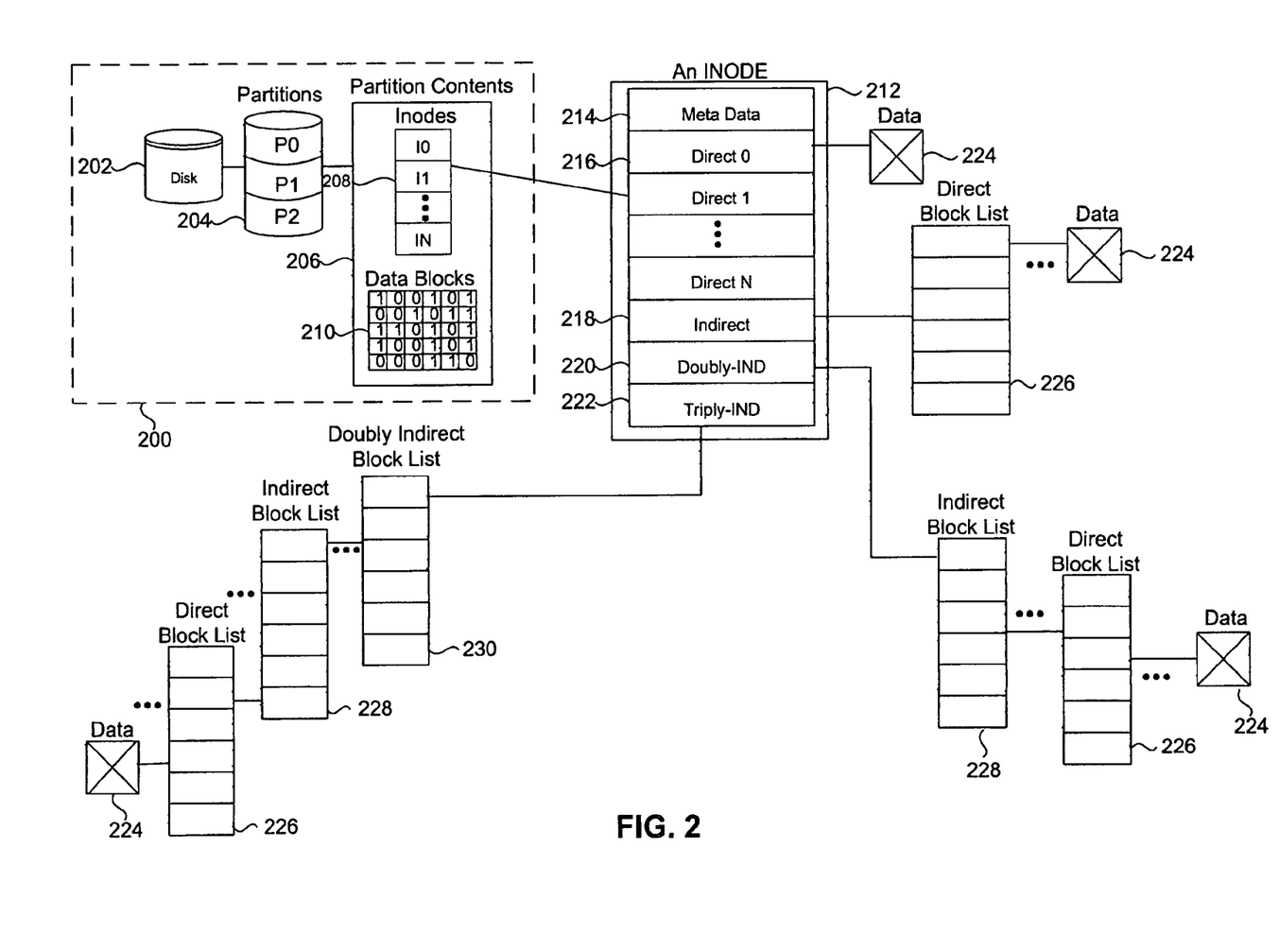
FIG. 2 illustrates a typical structural organization of data blocks on a disk, in accordance with an embodiment of the present invention.

A typical organizational structure for storing data in a disk such as disk 112 is shown in FIG. 2. A disk 202 can be divided into one or more partitions 204. Each partition has partition contents 206 which include inodes 208 and data blocks 210. An individual inode 212 comprises meta data 214, direct block pointers 216, indirect block pointers 218, doubly indirect block pointers 220, and triply indirect block pointers 222. One of sufficient skill in the relevant arts will appreciate that the quantity and availability of each kind of n-way indirect block pointers may vary based on the system, and may include greater or fewer levels of indirect block access.

An inode 212 comprises meta data 214, used for storing information about a file, and a series of block pointers. Each of the block pointers in the inode 212 contain a pointer to a block location within the data blocks 210. The direct block pointers 216 each contain a pointer to a block location comprising a block of data 224 within data blocks 210. Indirect block pointers 218 contain a pointer to a block location comprising a direct block list 226. The direct block list 226 comprises pointers to block locations, each comprising a block of data 224.

Similarly, the doubly-indirect block pointers 220 contain a pointer to a block location comprising an indirect block list 228, which in turn comprises pointers to block locations comprising direct block lists 226. The direct block lists 226 comprise pointers to block locations, each comprising a block of data 224.

Triply-indirect block pointers 222 contain a pointer to a block location comprising a doubly-indirect block list 230. The doubly-indirect block list 230 comprises pointers to block locations comprising indirect block lists 228, which in turn operate as detailed above.

In a typical storage system, a single file stored on a disk 202 is associated with a particular inode 212. If the file size is less than the size of a single block, then a single direct block pointer 216 will be used to point to the single block 224 where the data is placed. If the file is larger, then indirect block pointers are used in order to reference a direct block list 226 containing pointers to multiple data blocks 224.

Assuming a block size of 4 kB and a block list size of 1024 entries, a direct block list 226 contains pointers for 4 MB worth of data blocks 224. Accordingly, an indirect block list 228 with 1024 entries contains pointers for 1024 direct block lists 226, each comprising pointers for 4 MB worth of data blocks 224. Therefore, indirect block lists 228 in a typical system comprises pointers for 4 GB worth of data blocks 224. In a similar manner, doubly indirect block list 230 comprises 4 TB worth of data blocks 224. As a consequence, the singly indirect pointer within the inode may point to up to 4 MB of data, the doubly indirect pointer 4 GB of data, and the triply indirect pointer 4 TB of data.

Each block pointer may reference any particular 4 kB block on the disk 202 without limitation. Accordingly, it is possible for a first data block 224 referenced within a direct block list 226 to be located at a drastically different location on disk 202 than a second data block 224 referenced within the direct block list 226, with both blocks being part of a common file. Because an inode traditionally represents an entire single file, blocks located in drastically different locations on disk will cause slowdowns when attempting to access the file. Therefore, it is desirable to have all of the blocks that form a file to be allocated contiguously.

Figure 3:
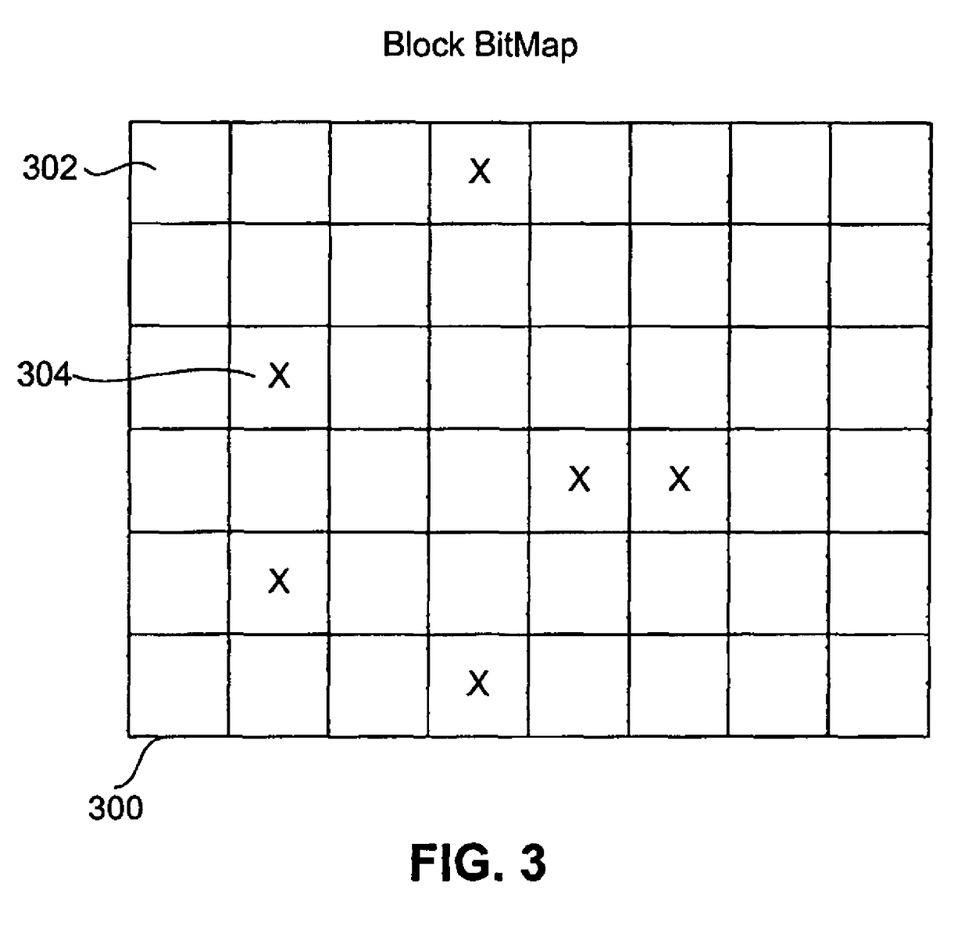
FIG. 3 illustrates a block bitmap structure, in accordance with an embodiment of the present invention.

Turning now to FIG. 3, a block bitmap 300 is also present in a typical filesystem alongside the inode tree structure. The block bitmap 300 contains an entry for each block in the entire filesystem, each entry indicating whether the block is free 302 or used 304. A block is marked as used 304 whenever a direct pointer within an inode as depicted in FIG. 2 points to the block. As one of sufficient skill in the relevant arts will acknowledge, multiple pointers can reference the same block. Accordingly, the block bitmap 300 is sometimes marked with a count of how many direct pointers point to the block. When the last direct pointer within an inode is zeroed or pointed to a different block, the relevant block is marked as free 302 and may be allocated to a new file.

Garbage Collection Inode

Figure 4:
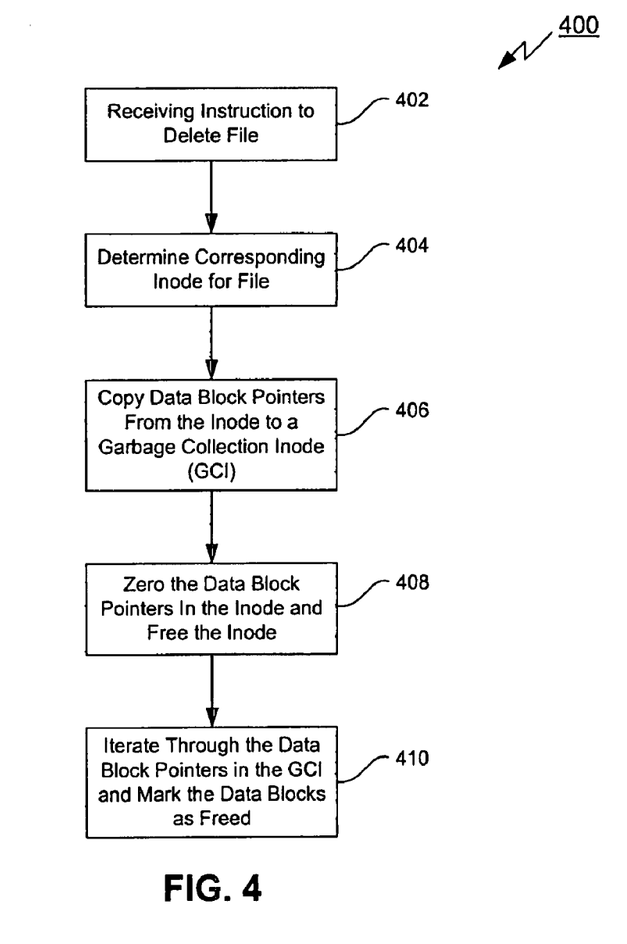
FIG. 4 is a flow chart illustrating a method by which a deletion operation is performed on an inode, in accordance with an embodiment of the present invention.

FIG. 4 is a flowchart 400 illustrating the steps by which a garbage collection inode ("GCI") may be employed in order to facilitate the deletion of a file, in accordance with an embodiment of the present invention. At step 402, an instruction to delete a particular file is received. The instruction contains a unique identifier for the file, such as a file name, in accordance with an embodiment of the present invention. Using the unique identifier, the file's associated inode can be determined at step 404. The inode's data block pointers are copied in step 406 to a GCI, and the pointers are zeroed and the entire inode freed in step 408. With the data block pointers now located in the GCI, it is possible to iterate through all of the data block pointers in the GCI and mark the data blocks pointed to by each of the data block pointers as freed in step 410.

In accordance with an embodiment of the present invention, data block pointers from multiple inodes may be copied, as in step 406, to the GCI before previous data block pointers have been completely deleted. The operation by which the copying step 406 is performed takes significantly less time than a deletion operation, in accordance with an embodiment of the present invention. Accordingly, several files and their associated inodes may be marked for deletion through this process by copying the data block pointers as in step 406 to the GCI in less time than it would take to delete each file using the methods in the prior art.

Figure 5:
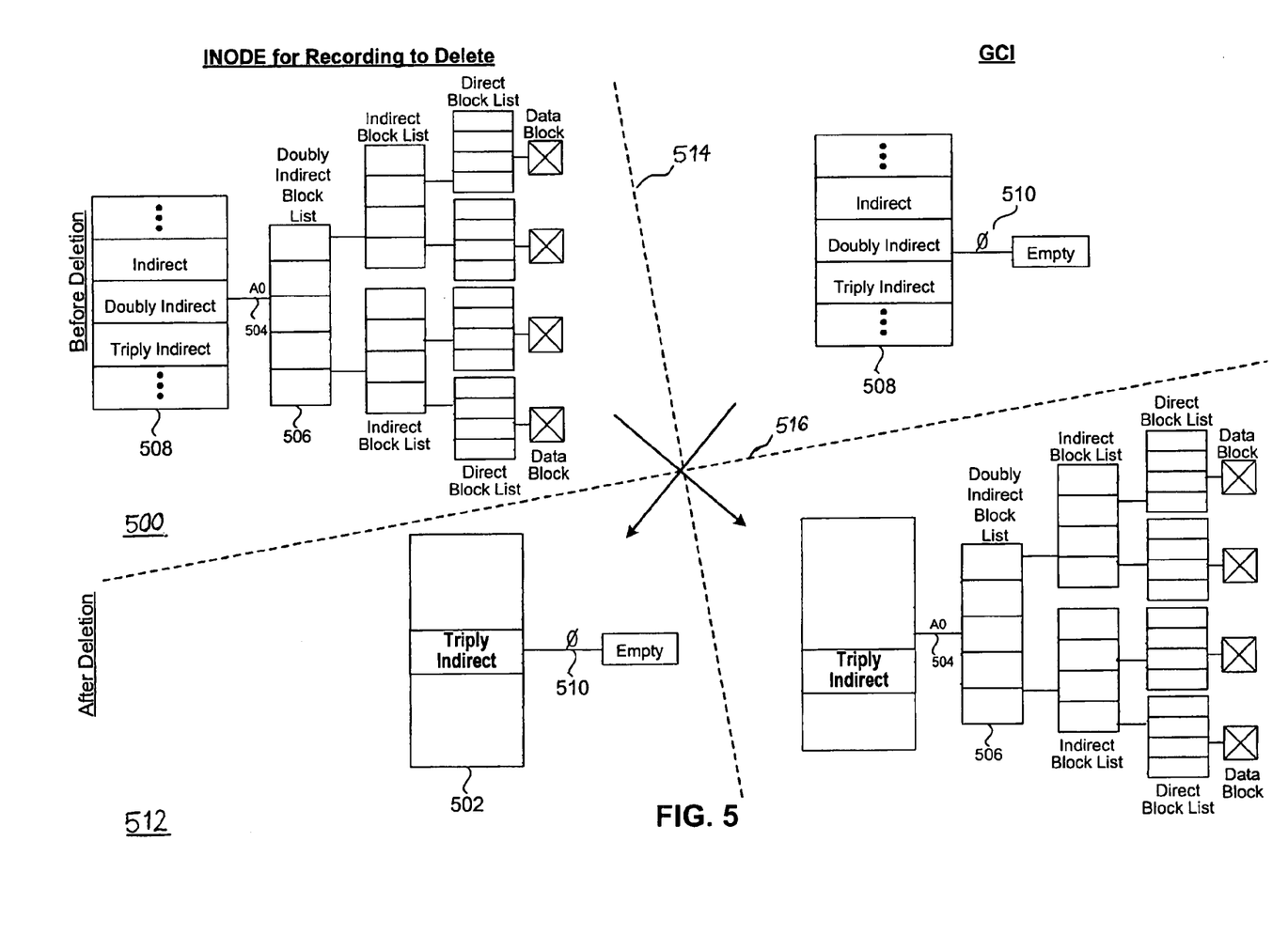
FIG. 5 illustrates a deletion operation performed on an inode, in accordance with an embodiment of the present invention.

FIG. 5 compares the operation of a GCI 508 to an inode 502 in accordance with an embodiment of the present invention. The GCI 508 is a specially-designated inode with the same structure as a regular inode 502. However, the GCI 508 will have its block pointers initially zeroed 510, such that the GCI 508 does not represent any area of memory. FIG. 5 illustrates, on the left column of the dashed lines 514, the state of an inode 502 to be deleted, and the state of the GCI 508 on the right column of the dashed lines 514. Both the inode 502 and the GCI 508 are shown prior to deletion 500 along the dashed lines 516, and after deletion 512 below the dashed lines 516.

With continued reference to FIG. 4, if a user wishes to delete a recording represented by inode 502, an instruction is provided as in step 402 indicating the recording or file to be deleted. As in step 404, the inode 502 associated with the file is determined. This inode 502 contains a pointer to a location $A_0$ where, for example, a doubly indirect block list 506 is found. The doubly indirect block list 506 contains indirect pointers to other lists, and traversing these lists eventually leads to the specific data blocks that comprise the recording represented by the inode 502. Traditionally, the filesystem would have to traverse through each block list to reach each data block, free the pointer referring to the data block, and furthermore mark the pointed to block as free in the block bitmap 300 (FIG. 3).

Considering a situation prior to deletion 500 of the recording represented by the inode 502, it is possible to realize a more efficient deletion operation through the use of the GCI 508. This is accomplished by transferring the address of a block list pointer 504 from the inode representing the recording to be deleted to the appropriate pointer in the GCI 508 as in step 406. As indicated in FIG. 5 after deletion 512, the GCI 508 would subsequently contain pointers to the data blocks that form the to-be-deleted recording. As in step 408, the original inode 502 has its pointer to the data blocks that form the to-be-deleted recording zeroed 510. The inode 502 is now empty. By performing this transfer on a pointer to a list of lists of data blocks, the entire recording to be deleted can be easily transferred to the GCI 508 in only two operations.

The data remains on the disk until the block bitmap 300 (FIG. 3) has been updated such that the data blocks which compose the to-be-deleted recording are set to a free state 302. This is accomplished as in step 410 by iterating through the pointers contained by the GCI 508 and marking the data blocks pointed to by the pointers as free.

Freeing Disk Blocks

With the blocks to be freed pointed to by the GCI 508, a separate process is operable to parse through the GCI 508 to free each of the relevant blocks as in step 410 (FIG. 4), in accordance with an embodiment of the present invention. The separate process may be a low priority process in order to free the blocks in the background without interrupting the operation of the DVR 100 (FIG. 1). In accordance with an embodiment of the present invention, the separate process frees the data blocks pointed to by the GCI 508 by traversing the GCI 508, zeroing the data block pointers, and marking the relevant block location in the block bitmap 300 as freed, as in step 410 (FIG. 4). One skilled in the relevant arts will appreciate that any method which can be used to delete an inode may similarly be applied to deletion of the recording pointed to by the GCI 508.

By deferring the lengthy process of iterating through the data block pointers in the GCI 508 and freeing the blocks to a separate, low priority process, filesystem functionality is not monopolized by the deletion requests, which otherwise block access to the disk resources until completed. Accordingly, a DVR 100 implementing this method to delete a recording from a disk 112 will allow a user to perform further operations immediately after requesting the deletion of a recording, rather than having to wait for the deletion to actually complete.

Example Computer System Implementation

Figure 6:
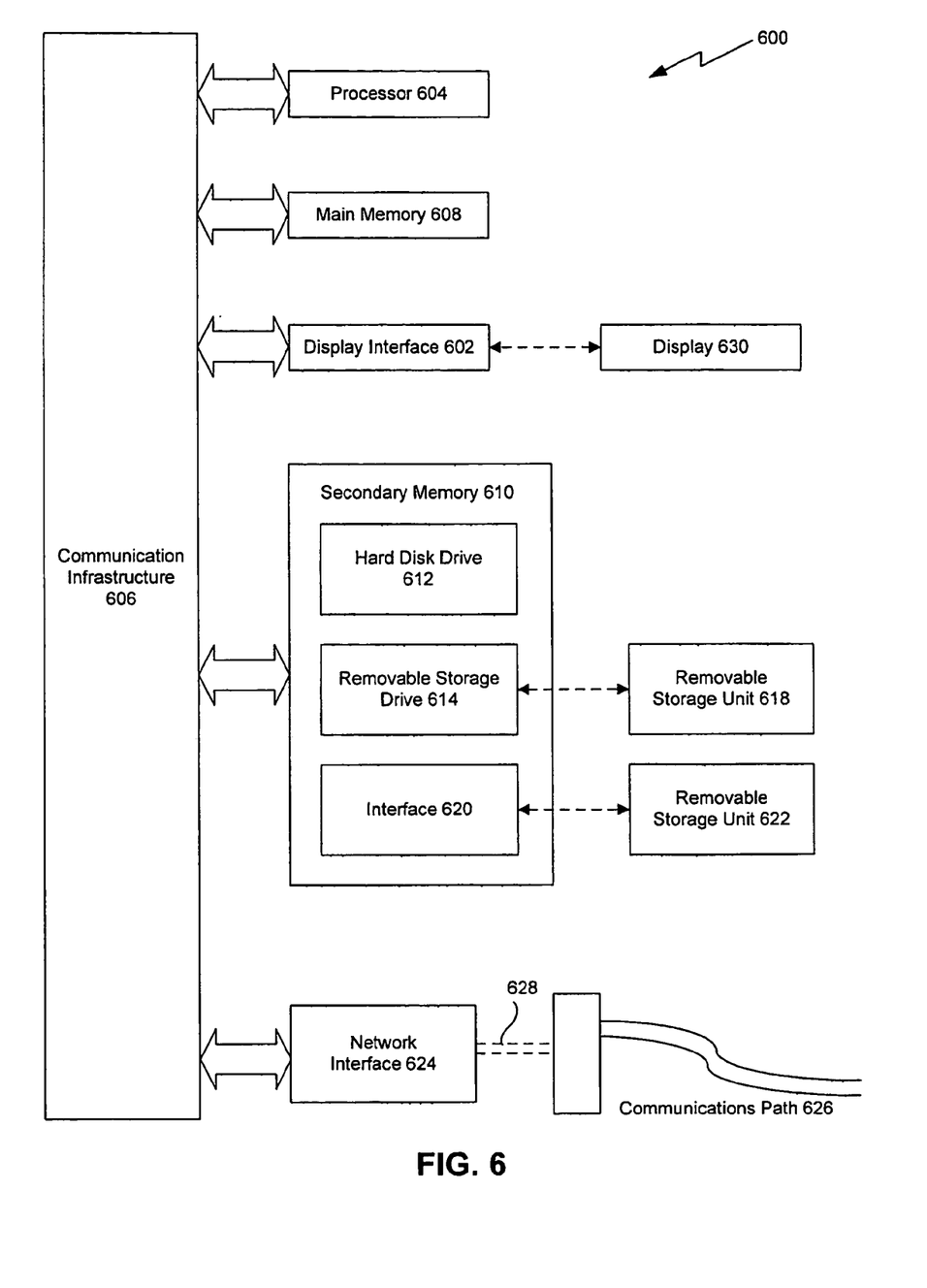
FIG. 6 depicts an example computer system in which the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the method illustrated by flowchart 400 of FIG. 4 can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612 and/or a removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, a hard disk installed in hard disk drive 612, and signals carried over communications path 626. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the method illustrated by flowchart 400 of FIG. 4 discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents. Furthermore, the disclosed data storage techniques are not limited to any particular memory device or those commonly used in DVR applications.

What is claimed is:

1. An apparatus comprising:
   a processor; and
   a memory, comprising:
      a first target file associated with one or more first data blocks and with a first inode;
      a second target file associated with one or more second data blocks and with a second inode; and
      a single garbage collection inode, wherein the garbage collection inode is configured to only point to data blocks of files marked for deletion;
   wherein the processor is configured to:
      copy an address of the one or more first data blocks associated with the first target file, from the first inode associated with the first target file, to the garbage collection inode,
      copy an address of the one or more second data blocks associated with the second target file, from the second inode associated with the second target file, to the garbage collection inode, and
      traverse the garbage collection inode and free the data blocks of the files marked for deletion.

2. The apparatus of claim 1, wherein the first target file comprises a video feed.

3. The apparatus of claim 1, further comprising:
   a tuner, wherein the tuner is configured to transmit a video feed to the processor, and wherein the processor is further configured to store the video feed to the first target file.

4. The apparatus of claim 1, wherein the processor is further configured to perform additional operations while the traversing the garbage collection inode and the freeing the data blocks of the files marked for deletion occurs in the background.

5. The apparatus, as set forth in claim 1, wherein the memory comprises a fixed recording medium.

6. The apparatus, as set forth in claim 5, wherein the fixed recording medium comprises a hard disk drive.

7. A method comprising:
   copying an address of one or more first data blocks associated with a first target file, from a first inode associated with the first target file, to a single garbage collection inode, wherein the garbage collection inode is configured to only point to data blocks of files marked for deletion;

copying an address of one or more second data blocks associated with a second target file, from a second inode associated with the second target file, to the garbage collection inode; and traversing the garbage collection inode and freeing the data blocks of the files marked for deletion.

8. The method as set forth in claim 7, wherein the copying comprises:

copying an indirect block pointer within the first inode associated with the first target file to the garbage collection inode, wherein the indirect block pointer points to an indirect block comprising a list of pointers to a set of blocks.

9. The method as set forth in claim 7, wherein the copying comprises:

copying a doubly indirect block pointer within the first inode associated with the first target file to the garbage collection inode, wherein the doubly indirect block pointer points to a doubly indirect block comprising a list of pointers to a set of indirect blocks, the set of indirect blocks comprising a list of pointers to a set of blocks.

10. A computer-readable storage medium having computer program logic recorded thereon that, when executed by a processor, causes the processor to perform a method, the method comprising:

copying an address of one or more first data blocks associated with a first target file, from a first inode associated with the first target file, to a single garbage collection inode, wherein the garbage collection inode is configured to only point to data blocks of files marked for deletion;

copying an address of one or more second data blocks associated with a second target file, from a second inode associated with the second target file, to the garbage collection inode; and traversing the garbage collection inode and freeing the data blocks of the files marked for deletion.

11. The computer-readable storage medium of claim 10, wherein the copying comprises:

copying an indirect block pointer within the first inode associated with the first target file to the garbage collection inode, wherein the indirect block pointer points to an indirect block comprising a list of pointers to a set of blocks.

12. The computer-readable storage medium of claim 10, wherein the copying comprises:

copying a doubly indirect block pointer within the first inode associated with the first target file to the garbage collection inode, wherein the doubly indirect block pointer points to a doubly indirect block comprising a list of pointers to a set of indirect blocks, the set of indirect blocks comprising a list of pointers to a set of blocks.

13. The computer-readable storage medium of claim 10, the method further comprising:

performing additional operations while the traversing of the garbage collection inode and the freeing of the data blocks of the files marked for deletion occurs in the background.

14. The method of claim 7, further comprising:

performing additional operations while the traversing of the garbage collection inode and the freeing of the data blocks of the files marked for deletion occurs in the background.

* * * * *